United States Patent
Shimoda et al.

(10) Patent No.: US 6,998,554 B2
(45) Date of Patent: Feb. 14, 2006

(54) PUSH-BUTTON SWITCH UNITS FOR VEHICLE INTERIOR LIGHT ASSEMBLY

(75) Inventors: Yuji Shimoda, Kawagoe (JP); Hiroshi Ochiai, Kawagoe (JP)

(73) Assignee: Kabushiki Kaisha T AN T, Kawagoe (JP)

(*) Notice: Subject to any disclaimer, the term of this patent is extended or adjusted under 35 U.S.C. 154(b) by 0 days.

(21) Appl. No.: 11/005,299

(22) Filed: Dec. 7, 2004

(65) Prior Publication Data

US 2005/0133355 A1    Jun. 23, 2005

(30) Foreign Application Priority Data

Dec. 22, 2003  (JP)  .............. 2003-425311

(51) Int. Cl.
*H01H 3/12* (2006.01)

(52) U.S. Cl. .................... 200/341; 200/314
(58) Field of Classification Search ......... 200/310–345
See application file for complete search history.

(56) References Cited

U.S. PATENT DOCUMENTS

| | | | |
|---|---|---|---|
| 4,367,384 A * | 1/1983 | Waarle | 200/517 |
| 5,521,347 A * | 5/1996 | Imaeda et al. | 200/525 |
| 6,066,819 A * | 5/2000 | Takano et al. | 200/345 |
| 6,273,593 B1 | 8/2001 | Yabata et al. | |
| 6,402,570 B1 | 6/2002 | Soga et al. | |
| 6,590,175 B1 * | 7/2003 | Lam | 200/315 |
| 6,781,076 B1 * | 8/2004 | Takiguchi et al. | 200/316 |
| 2003/0089587 A1 * | 5/2003 | Mayo et al. | 200/329 |

FOREIGN PATENT DOCUMENTS

| | | |
|---|---|---|
| JP | 63-45923 | 3/1988 |
| JP | 2000-344010 | 12/2000 |
| JP | 2001-180372 | 3/2001 |

* cited by examiner

*Primary Examiner*—Elvin G. Enad
*Assistant Examiner*—Lisa Klaus
(74) *Attorney, Agent, or Firm*—Nixon & Vanderhye, P.C.

(57) ABSTRACT

A push-button switch unit includes a push switch which is fixed to a main body and includes an operating part; and a push button fitted to the operating part. The push button is pressed in order to turn the push switch on and off. An undersurface of the push button is provided with a pair of shaft rods each having a columnar segment and a prismatic segment. The main body includes shaft sockets each having a circular hole segment and a rectangular hole segment for receiving a corresponding one of the shaft rods.

11 Claims, 7 Drawing Sheets

PUSH-BUTTON SWITCH UNITS FOR VEHICLE INTERIOR LIGHT ASSEMBLY

BACKGROUND OF THE INVENTION

1. Field of the Invention

The present invention relates to push-button switch units for turning on and off a lamp disposed in an in-vehicle interior light assembly. More particularly, the present invention relates to push button structures attached to an operating part of a push switch.

2. Description of the Related Art

Japanese Unexamined Utility Model Registration Application Publication No. 63-45923, for example, discloses a conventional push-button switch unit in which a push button is attached to an operating part of a push switch. According to such a push-button switch unit, the operating part of the push switch is fixed to a casing, and the push button is provided with cylindrical guiding columns. The cylindrical guiding columns engage with circular guiding holes provided in an operating surface of the casing. When the push button is pressed, the operating part of the push switch is pressed such that the push switch is turned on or off.

In such a conventional structure in which the cylindrical guiding columns engage with the circular guiding holes, if the guiding columns are narrow in width, the guiding columns may become deformed if the push button is pressed off-center, that is at a position which deviates from the center of the push button. This in turn may cause the push button to move downwardly in a tilted or skewed state instead of a state aligned longitudinally with the guiding columns. Such tilted or skewed movement may thus increase the frictional resistance between the guiding columns and the guiding holes. In such a case, a smooth switch operation cannot be performed. On the other hand, because the push button is formed of a synthetic resin and is fabricated by injection molding, if the width (radius) of the guiding columns is increased, depressions, also known as sink marks, may be formed in sections of the top surface of the push button below which the guiding columns are disposed. This is problematic in that the product value is deteriorated.

SUMMARY OF THE INVENTION

In view of these circumstances described above, an object of the present invention is to provide a push-button switch unit in which a push button is adapted to move while maintaining an aligned state regardless of the location at which the push button is pressed. A further object of the present invention is to provide a push button having minimal if any) injection molding sink marks such that the product value is maintained.

In order to achieve the above-mentioned objects, a push-button switch unit according to the present invention includes a push switch which is fixed to a main body, an operating part, and a push button fitted to the operating part. The push button is pressed in order to turn the push switch on and off. Either an undersurface of the push button or the main body is provided with a pair of shaft rods each having a columnar cylindrical segment and a prismatic segment. On the other hand, the other of the push button or the main body includes shaft sockets each having a circular hole segment and a rectangular hole segment for receiving a shaft rod of corresponding geometry.

A side surface of each prismatic segment which is disposed the farthest distance from the columnar segment is preferably flat so as to provide an increased surface area, whereby the push button is prevented from tilting even when the push button is pressed in a lopsided or off-center manner.

Furthermore, the side surfaces of the prismatic segments disposed the farthest distance from the corresponding columnar segments may either face each other, face the same direction, or face directions opposite to each other.

As described above, according to the present invention, the pair of shaft rods each having the columnar segment and the prismatic segment may be provided on the undersurface of the push button, while the shaft sockets having the circular hole segment and the rectangular hole segment for receiving the correspondingly configured shaft rod may be provided in the main body. Alternatively, the pair of shaft rods each having the columnar segment and the prismatic segment may be provided on the main body, while the shaft sockets each having the circular hole segment and the rectangular hole segment for receiving the corresponding shaft rod may be provided in the push button. Consequently, even when the push button is pressed in a lopsided or off-center manner, the push button moves while maintaining a longitudinally aligned state and thus is not tilted or skewed in the longitudinal direction. Moreover, because each of the shaft rods is provided with a large cross-sectional surface area, sink marks are prevented from being formed when such parts are injection molded. Accordingly, this prevents the product value from deteriorating.

Since the flat side surface of each prismatic segment provides a large surface area, the push button is further prevented from tilting when the push button is pressed in a lopsided manner.

BRIEF DESCRIPTION OF THE DRAWINGS

Reference will be made to the accompanying drawings wherein like reference numerals throughout the various Figures denote like structural elements, and wherein.

DESCRIPTION OF THE PREFERRED EMBODIMENTS

Embodiments of a push-button switch unit according to the present invention will be described with reference to the accompanying drawing FIGS. 1–7. In this regard, Either an undersurface of the push button or the main body is provided with a pair of shaft rods each having a columnar cylindrical segment and a prismatic segment. On the other hand, the other of the push button or the main body includes shaft sockets each having a circular hole segment and a rectangular hole segment for receiving a shaft rod of corresponding geometry. The push-button switch unit according to the present invention is used in, for example, an in-vehicle interior light device.

Figure 1:
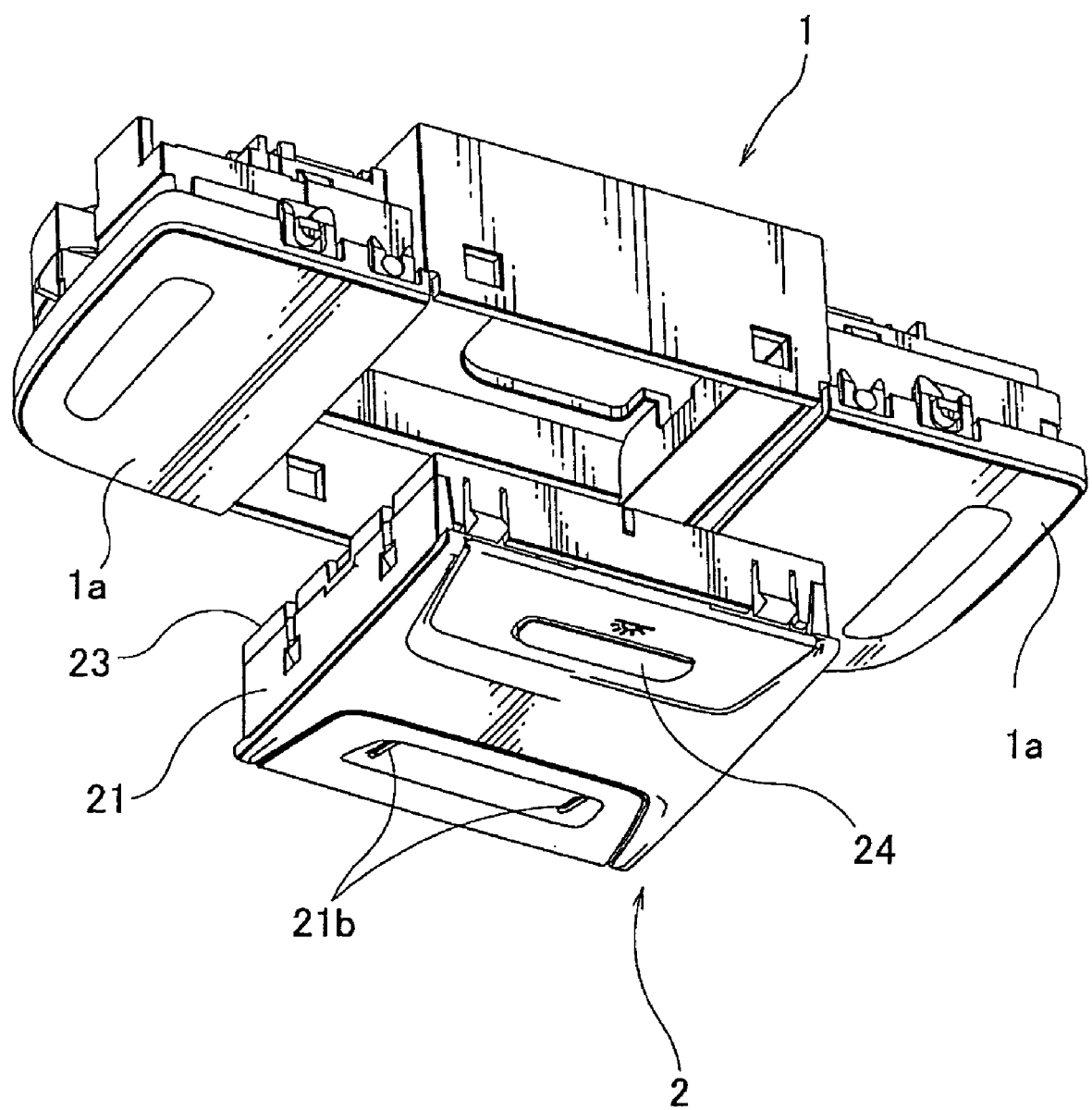
FIG. 1 is an exploded perspective view of an in-vehicle interior light device in which a push-button switch unit according to the present invention is included.
Figure 2:
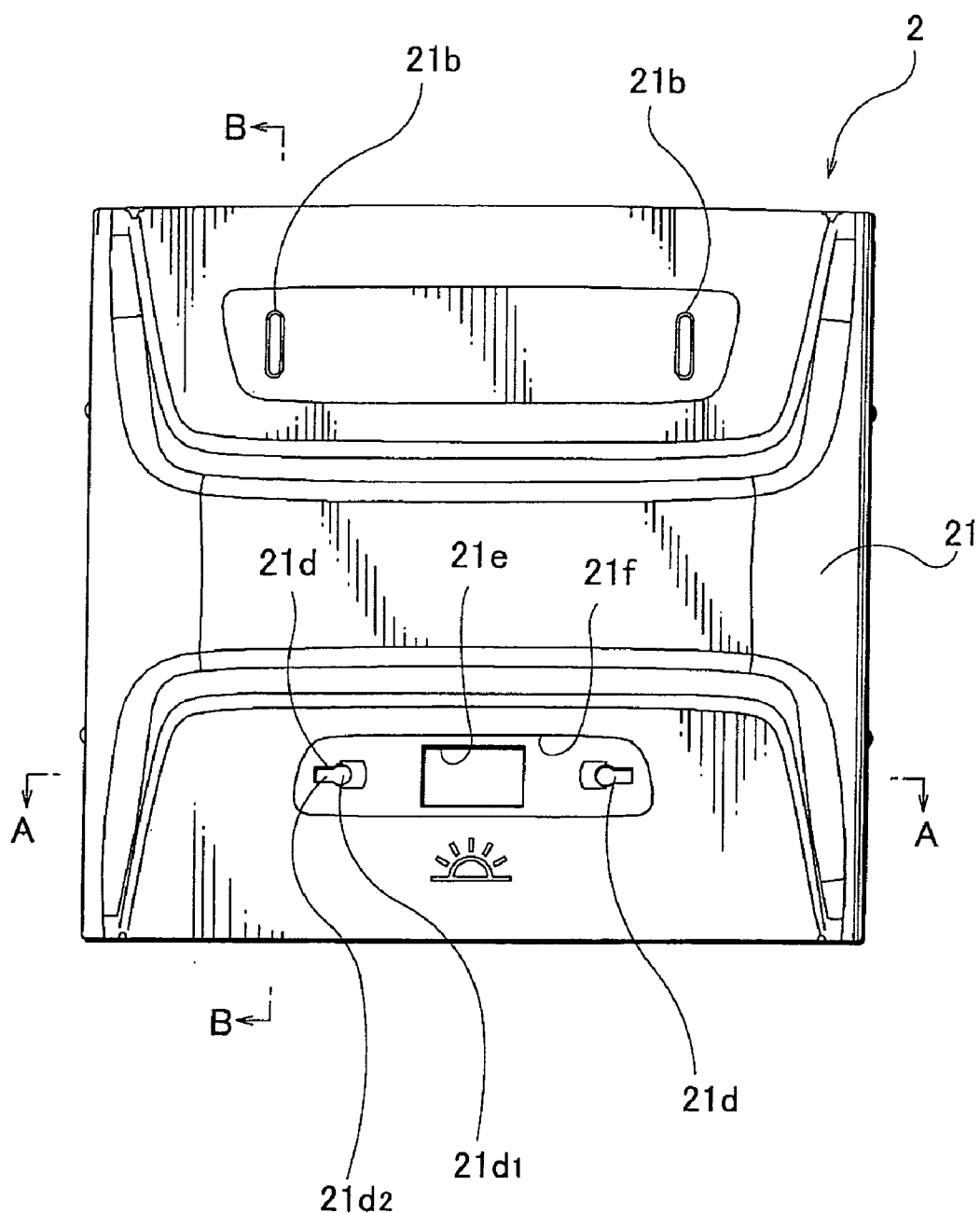
FIG. 2 is a partial front view of the in-vehicle interior light device in an assembled state.
Figure 3:
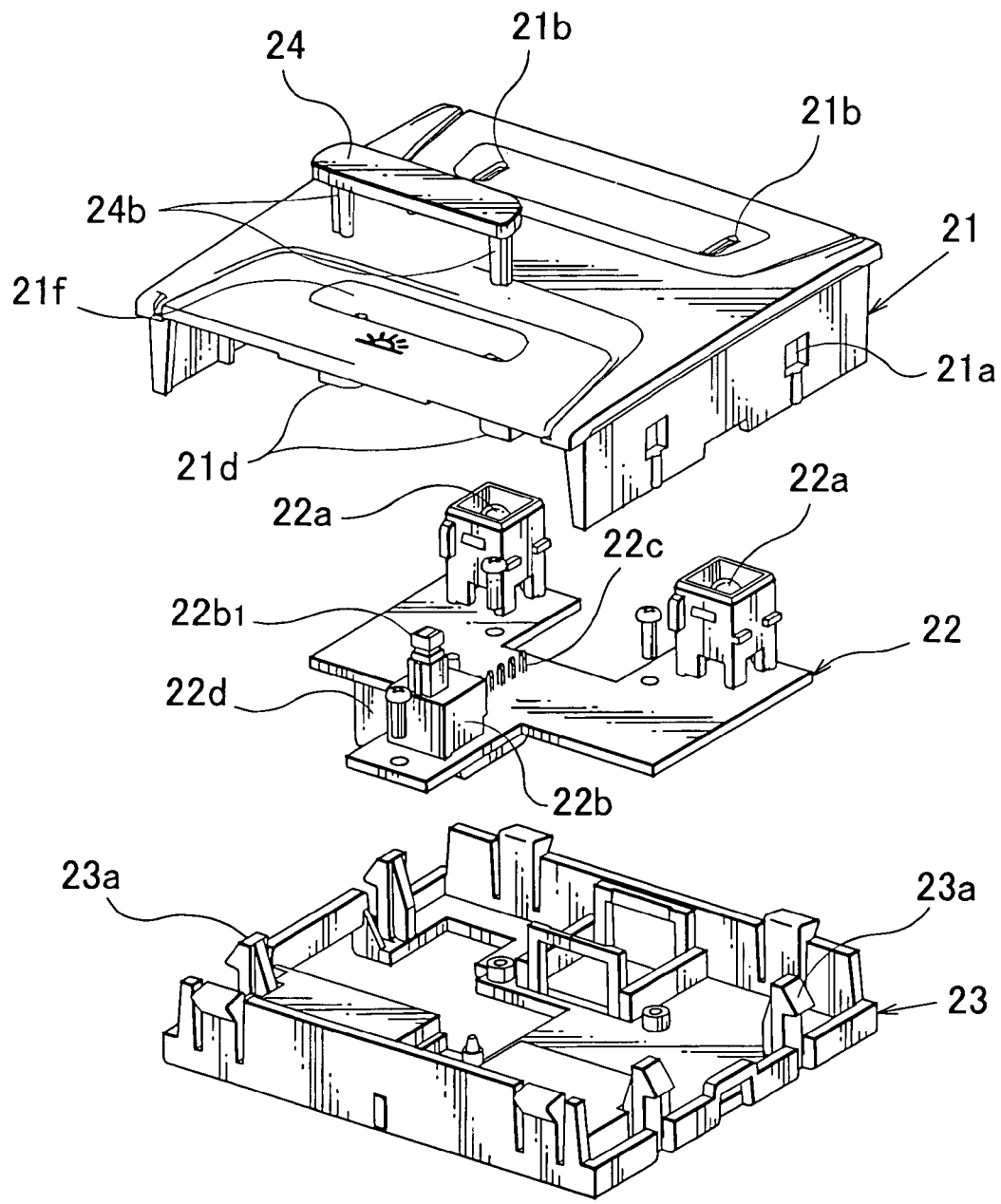
FIG. 3 is an exploded perspective view of an operating box shown in FIG. 1.

FIG. 1 is a perspective view of the in-vehicle interior light device having a box-like main body 1 formed by, for example, injection molding. The main body 1 has three chambers which are separated from one another with respect to the longitudinal direction. The left and right chambers each accommodate a lamp and a push switch. Moreover, each of the left and right chambers tiltably supports a lens plate 1a in a cantilevered manner at a section of the chamber adjacent to the center of the main body 1.

By pressing one of the lens plates 1a, the corresponding push switch is turned on, and accordingly, this turns on the corresponding lamp. Moreover, pressing the same lens plate 1a again will turn off the push switch so as to turn off the lamp. Such a structure of an in-vehicle interior light device is commonly known and is disclosed in, for example, U.S. Pat. No. 6,273,593, the entire content of which is expressly incorporated hereinto by reference. Furthermore, the back face of the main body 1 is provided with a bus bar, which is not shown in the drawings, for connecting the lamps and the push switches with a power source, such as a battery.

FIGS. 2 to 5A illustrate the structure of an operating box 2 preferably disposed in the middle chamber of the main body 1. The operating box 2 includes a front casing 21, a printed circuit board 22 fixed within the front casing 21 via, for example, screws, and a rear casing 23 provided with claws 23a which engage with holes 21a provided in the front casing 21 such that the rear casing 23 is joined as a unit to the front casing 21.

The front casing 21 is also provided with two transmission openings 21b through which light emitted from a pair of light-emitting diodes 22a passes. Furthermore, referring to FIG. 7, the undersurface of the front casing 21 is provided with light-shielding protrusions 21c each surrounding the corresponding one of the transmission openings 21b.

A push button 24 is disposed above the front casing 21 for turning the light-emitting diodes 22a located on the printed circuit board on and off, and will be described later in greater detail. The push button 24 has a pair of shaft rods 24b which are respectively slidably received within a pair of shaft sockets 21d in the front casing 21. Moreover, the front casing 21 is further provided with a depression 21f having a hole 21e through which an operating part $22b_1$ of a push switch 22b (soldered on the printed circuit board 22) outwardly protrudes.

The printed circuit board 22 includes the light-emitting diodes 22a, and the push switch 22b which is soldered on the printed circuit board 22 and is used for turning the light-emitting diodes 22a on and off. The undersurface of the printed circuit board 22 is provided with a connector box 22d into which connector terminals 22c extend. The connector terminals 22c are connected with an electrically-conductive pattern on the printed circuit board 22. The connector box 22d is connected with the bus bar mentioned above.

Figure 4:
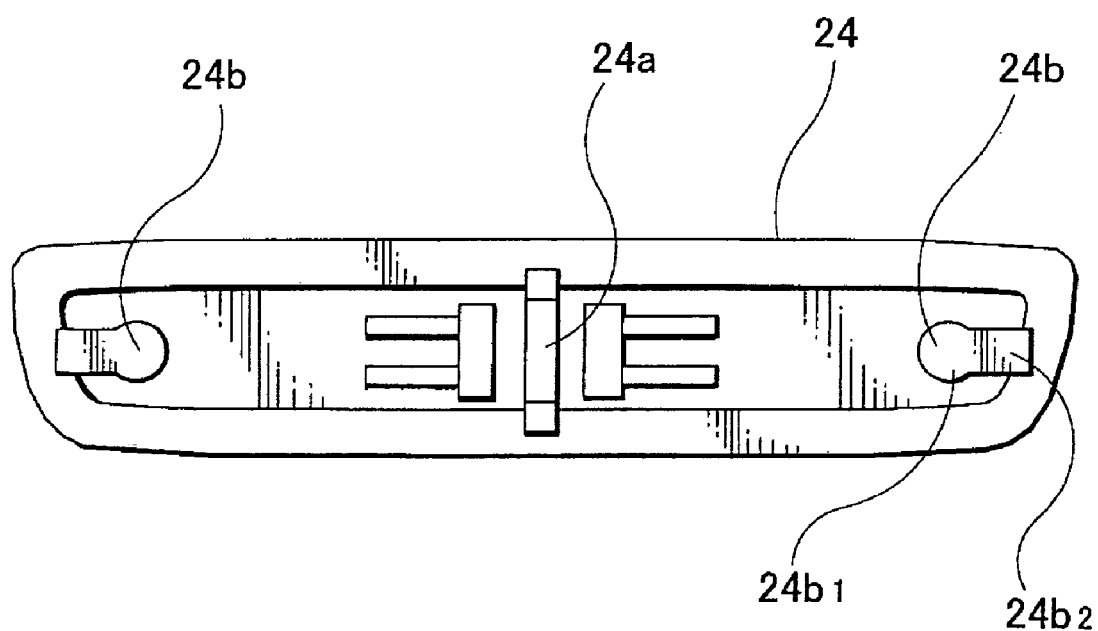
FIG. 4 illustrates an undersurface of a push button.
Figure 5A:
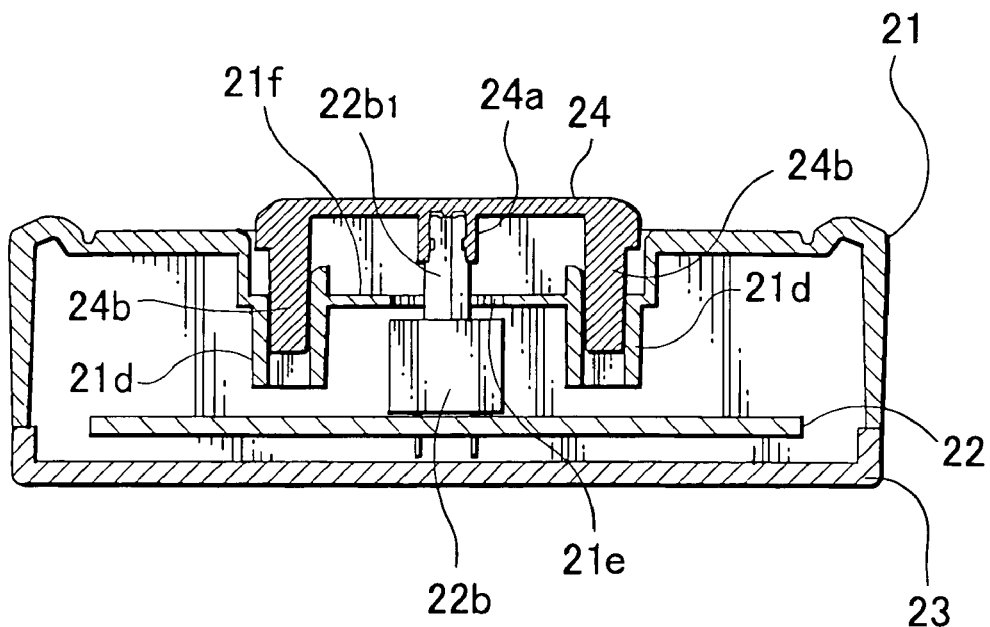
FIG. 5A is a cross-sectional view illustrating an embodiment of the present invention in which shaft rods of the push button are fitted to shaft sockets of a front casing.

Referring to FIGS. 4 and 5A, the push button 24 has an engagement portion 24a at the center of its undersurface, such that the engagement portion 24a is disposed between the two shaft rods 24b. The engagement portion 24a engages with the operating part $22b_1$ of the push switch 22b. The shaft rods 24b each have a cylindrically columnar segment $24b_1$, and a prismatic segment $24b_2$ extending transversely outwardly from the columnar segment $24b_1$ (that is, extending horizontally therefrom as viewed in plan). On the other hand, referring to FIG. 2, each of the shaft sockets 21d has a circular hole segment $21d_1$ and a rectangular hole segment $21d_2$ sized and configured to accept therewithin the columnar segment $24b_1$ and the prismatic segment $24b_2$, respectively, of a corresponding one of the shaft rods 24b. The shaft rods 24b thus have a solid key-hole like cross-section which is configured to be fitted within the key-hole like opening of the shaft sockets 21d.

Because the cross-section of each shaft rod 24b provided with the cylindrically columnar segment $24b_1$ and the prismatic segment $24b_2$ extends longitudinally along the undersurface of the push button 24, the push button 24 is prevented from tilting with respect to the horizontal plane when the push button 24 is pressed downward. More specifically, even if one of the longitudinal ends of the push button 24 is pressed, the shaft rods 24b (whose cross-section section extends in the longitudinal direction of the push button 24) move directly in the pressing direction. Moreover, the terminal end side of each prismatic segment $24b_2$, that is the side which is disposed the farthest from the cylindrically columnar segment 24b is a flat surface which is in face-to-face contact with an inner surface of the corresponding rectangular hole segment $21d_2$. This increases the contact resistance between the prismatic segments $24b_2$ and the rectangular hole segments $21d_2$ so as to prevent the push button 24 from tilting due to an off-center pushing force. Accordingly, this ensures a proper and smooth pressing operation of the push switch 22b.

On the other hand, if the side of each prismatic segment $24b_2$ is arcuately shaped, the push button 24 may have the tendency to tilt easily with respect to the horizontal plane when the push button 24 is pressed. This is because the arcuately shaped portion of each prismatic segment $24b_2$ and the rectangular hole segment $21d_2$ of the corresponding shaft socket 21d are in line contact with each other. In other words, this reduces the contact area between the prismatic segment $24b_2$ and the rectangular hole segment $21d_2$. Accordingly, the side of each prismatic segment $24b_2$ disposed the farthest from the corresponding columnar segment $24b_1$ according to the present invention is preferably a flat (planar) surface which is in face-to-face (opposed) contact with a similar flat (planar) surface of the rectangular hole segment $21d_2$.

The push button 24 is most preferably formed of synthetic resin and is fabricated by injection molding. Generally, a synthetic resin is cooled after being removed from an injection mold, thus allowing the synthetic resin to contract. During the contracting process, depressions, also known as sink marks, are formed on the surface of the push button 24 below which the shaft rods 24b are disposed. If the shaft rods 24b are cylindrical columns, it is likely that the thickness of the shaft rods 24b will induce sink marks on the surface of the push button 24 during the cooling process. On the other hand, the shaft rods 24b according to the present invention each have an elongated structure in cross-section such that the elongated cross-sectional plane of each shaft rod 24b extends in the longitudinal direction of the push button 24. This prevents the thickness of the push button 24 from being concentrated in certain regions of the push button 24. Consequently, the present invention prevents sink marks from being formed on the push button 24 so as to achieve a better product appearance, meaning that the product value is prevented from deteriorating.

Although the two prismatic segments $24b_2$ of the opposing shaft rods 24b face opposite directions from each other in plan view in the above embodiment (i.e., in a direction toward a respective longitudinal end of the push button 24), the prismatic segments $24b_2$ may alternatively face towards each other (i.e., each facing toward the center of the push button 24) or may alternatively face in the same direction (i.e., each facing toward the same longitudinal end of the push button 24).

Figure 5B:
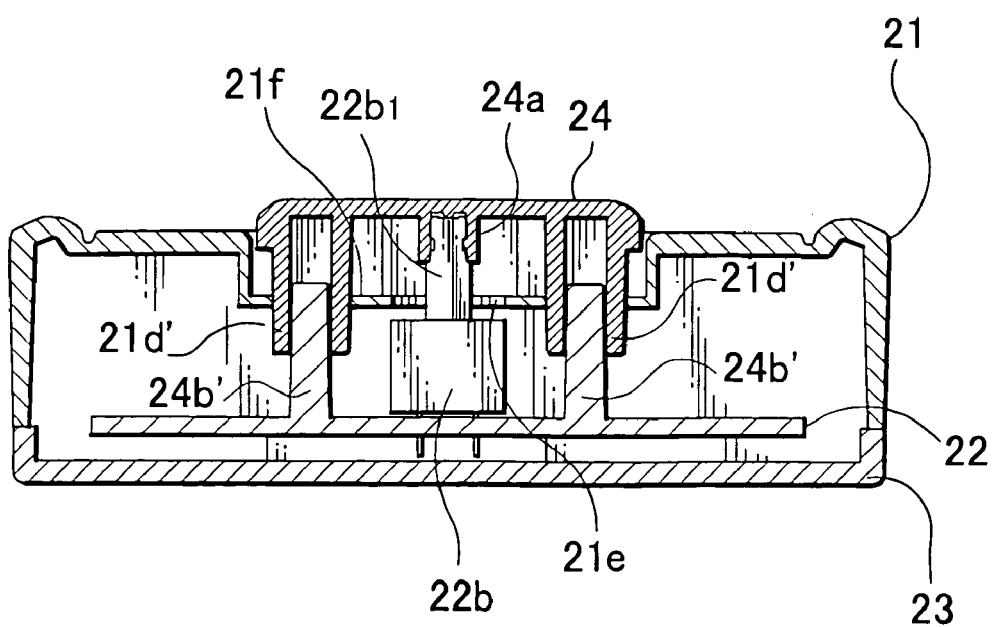
FIG. 5B is a cross-sectional view illustrating an alternative embodiment of the present invention in which shaft rods of a printed circuit board are fitted to shaft sockets of the push button.

As a further alternative, referring to FIG. 5B, a pair of shaft rods 24b' may be disposed on the surface of the printed circuit board 22 facing the front casing 21, and a pair of shaft sockets 21d' may be provided in the push button 24. Furthermore, although the push switch 22b is fixed to the printed circuit board 22 and the shaft sockets 21d are disposed in the front casing 21 in the above embodiment, the push switch 22b and the shaft sockets 21d may both be disposed in the front casing 21.

Figure 6:
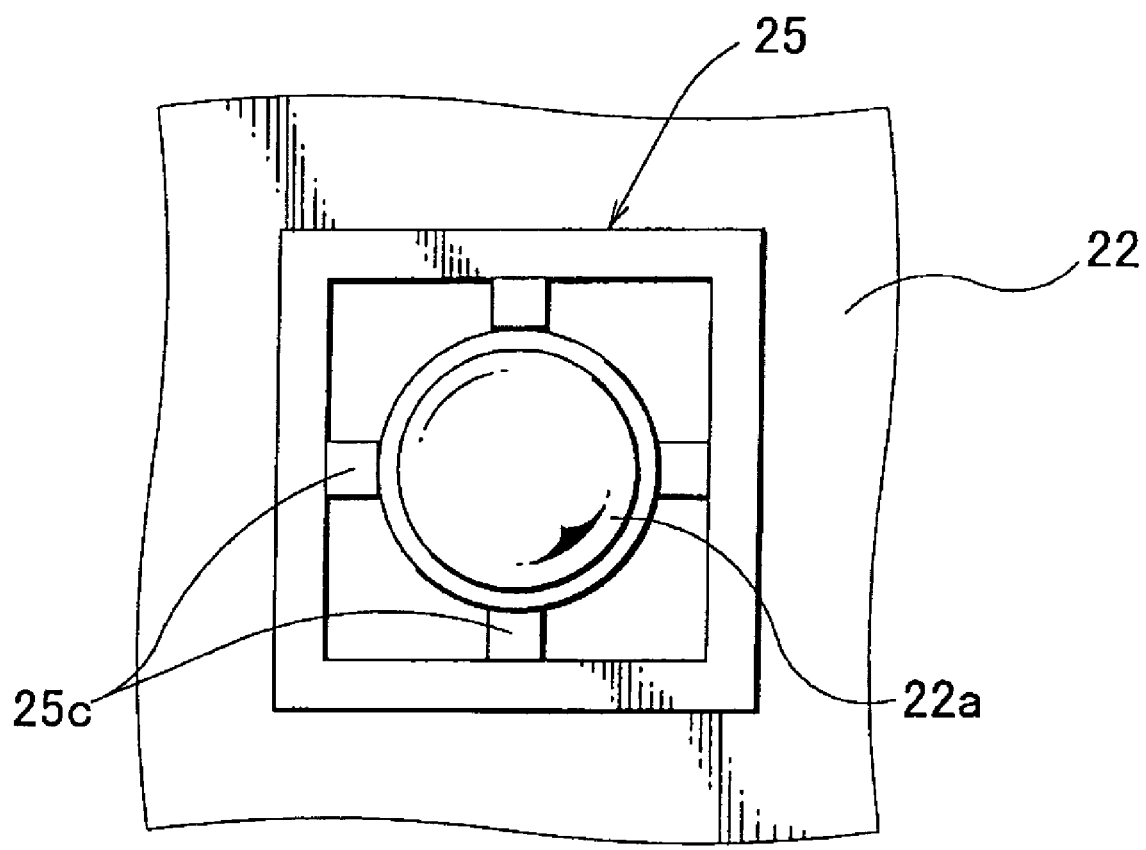
FIG. 6 is a plan view illustrating a state where one of light-emitting diodes is fixed on the printed circuit board.
Figure 7:
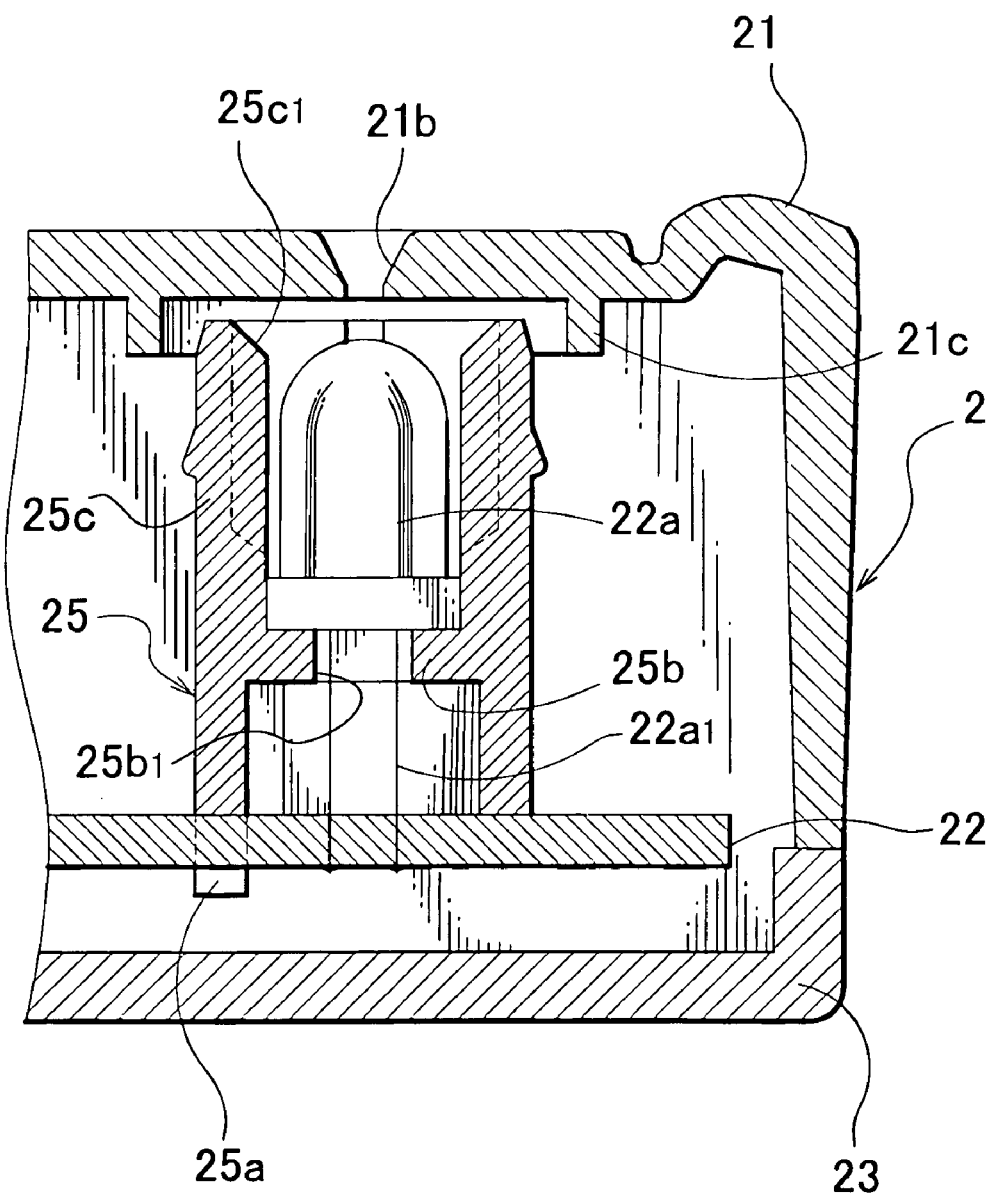
FIG. 7 is a cross-sectional view illustrating a state where one of the light-emitting diodes is soldered on the printed circuit board.

FIGS. 6 and 7 illustrate how the light-emitting diodes 22a are fixed on the printed circuit board 22. In detail, before the light-emitting diodes 22a are soldered onto the printed circuit board 22, a pair of holders 25 is preliminarily fixed onto the printed circuit board 22. Then, the light-emitting diodes 22a are inserted into the holders 25, and lead wires $22a_1$ of the light-emitting diodes 22a are inserted through through-holes provided in the printed circuit board 22. The lead wires 22a are then soldered onto the printed circuit board 22.

The holders 25 are formed of a resin material having a rectangular-tubular structure. The bottom portion of each holder 25 is provided with a pair of legs 25a used for the positioning of the holder 25. Specifically, the legs 25a are diagonally opposed to each other and extend throughholes provided in the printed circuit board 22 for positional alignment. Furthermore, each holder 25 has a supporting base 25b which supports the bottom surface of the corresponding light-emitting diode 22a and is provided with a hole $25b_1$ through which the lead wires $22a_1$ extend. Moreover, the sidewalls of the holder 25 above the supporting base 25b are provided with ribs 25c for preventing the light-emitting diode 22a from becoming loose. The upper ends of the ribs 25c are provided with tapered surfaces $25c_1$ for allowing the light-emitting diode 22a to be smoothly inserted into the holder 25 during the installation process.

The upper opening of each holder 25 is disposed within the corresponding one of the light-shielding protrusions 21c provided on the undersurface of the front casing 21 such that the holder 25 engages with the light-shielding protrusion 21c. Accordingly, when electricity is applied to the light-emitting diode 22a to turn on the light-emitting diode 22a, the light emitted from the light-emitting diode 22a travels towards the corresponding transmission opening 21b in the front casing 21. Thus, the light passes through the transmission opening 21b so as to be incident on a spot inside a vehicle, such as a cup holder disposed inside a vehicle.

Although the light emitted from each light-emitting diode 22a is originally dispersed at a wide angle, because the light-emitting diode 22a is housed inside the corresponding holder 25, the light is prevented from being widely dispersed more than the opening of the holder 25. Furthermore, since the opening of the holder 25 is surrounded by the corresponding light-shielding protrusion 21c, the light from the light-emitting diode 22a leaking from the opening of the holder 25 is blocked by the light-shielding protrusion 21c. This prevents light leakages from the in-vehicle interior light device.

Although the push-button switch unit according to the above embodiment of the present invention is used in an in-vehicle interior light device, the push-button switch unit according to the present invention may be used in other alternative devices that are operated by pressing a push button to turn on and off a push switch.

What is claimed is:

1. A push-button switch unit comprising:
   a main body having a base;
   a push switch which fixed to the base, said push switch having a switch operating part; and
   a push button operatively engaged with the operating part such that pressing the push button operates the operating part so as to turn the push switch on and off, and wherein
   one of the push button and main body includes a pair of shaft rods each having a solid keyhole shape in cross-section, and wherein
   the other of the push button and main body includes a pair of key hole sockets for slideably receiving a corresponding one of the shaft rods, wherein
   each of said shaft rods has a cylindrically columnar segment and a prismatic segment extending outwardly from said columnar segment, and wherein
   each of said shaft sockets have a circular hole segment and a rectangular segment so as to establish a cross-sectional shape which corresponds to the cross-sectional shape of the shaft rods and thereby slideably receive respective ones of the shaft rods therewithin.

2. The push button switch unit of claim 1, wherein an undersurface of the push button is provided with said pair of shaft rods, and wherein the main body includes a front casing provided with said shaft sockets.

3. The push-button switch unit according to claim 2, wherein a side surface of each prismatic segment disposed the farthest from the columnar segment is flat so as to increase the contact area between each shaft rod and the corresponding shaft socket, whereby the push button is prevented from tilting in response to an off-center pushing force.

4. The push-button switch unit according to claim 2, wherein side surfaces of the prismatic segments disposed the farthest from the corresponding columnar segments face each other.

5. The push-button switch unit according to claim 2, wherein side surfaces of the prismatic segments disposed the farthest from the corresponding columnar segments face the same direction.

6. The push-button switch unit according to claim 2, wherein side surfaces of the prismatic segments disposed the farthest from the corresponding columnar segments face directions opposite to each other.

7. The push-button switch unit of claim 1, wherein the base of the main body is provided with said pair of shaft rods, and wherein the push button includes said shaft sockets.

8. The push-button switch unit according to claim 7, wherein a side surface of each prismatic segment disposed the farthest from the columnar segment is flat so as to increase the contact area between each shaft rod and the corresponding shaft socket, whereby the push button is prevented from tilting in response to an off-center pushing force.

9. The push-button switch unit according to claim 7, wherein side surfaces of the prismatic segments disposed the farthest from the corresponding columnar segments face each other.

10. The push-button switch unit according to claim 7, wherein side surfaces of the prismatic segments disposed the farthest from the corresponding columnar segments face the same direction.

11. The push-button switch unit according to claim 7, wherein side surfaces of the prismatic segments disposed the farthest from the corresponding columnar segments face directions opposite to each other.

* * * * *